Patented Apr. 2, 1935

1,996,475

UNITED STATES PATENT OFFICE 1,996,475

MONOHYDROXYCHRYSENE AND PROCESS OF MAKING THE SAME

Walter Kern, Sissach near Basel, Switzerland, assignor to the firm of Society of Chemical Industry in Basle, Basel, Switzerland No Drawing. Application June 16, 1934, Serial No. 730,999. In Switzerland June 30, 1933

4 Claims. (Cl. 260—154)

This invention relates to the manufacture of a monohydroxychrysene by heating with a dilute acid the monoaminochrysene obtainable by mononitrating chrysene and reducing the nitro-compound thus produced.

The acid with which the monoaminochrysene is to be heated may be an inorganic acid, for instance, dilute sulfuric acid or dilute hydrochloric acid, or an organic acid, for instance dilute formic acid, dilute acetic acid, dilute benzenesulfonic acid, a dilute naphthalene-mono- or polysulfonic acid or dilute benzoic acid.

The process may also be conducted by heating a salt of the monoaminochrysene with water; in this case the hydrolysis of the salt supplies the dilute acid.

The monohydroxychrysene is a valuable intermediate product, for example for making dyestuffs or pharmaceutical products.

The monoaminochrysene which is the parent material may be made in the following manner:—

228 parts by weight of chrysene, 1000 parts of glacial acetic acid and 102.6 parts of nitric acid of 68.6 per cent. strength are heated together, while stirring, for 6 hours on the boiling water-bath. The cooled mixture is then filtered and the mononitrochrysene on the filter is washed with alcohol and dried. When recrystallized from xylene it forms yellow needles which melt at 209° C.

273 parts of this mononitrochrysene are suspended in 6000 parts of glacial acetic acid. 270 parts of tin shavings and 820 parts by volume of concentrated hydrochloric acid are added, while stirring well, in the course of 1½ to 2 hours, the temperature being 85–100° C. After stirring further for 2 hours at 100° C. the whole is allowed to cool and filtered. The tin double salt of the monoaminochrysene remaining on the filter is split up by boiling dilute caustic soda solution. The monoaminochrysene thus obtained in good yield is a light-colored powder, which melts at 199–201° C. after recrystallization from alcohol.

The following examples illustrate the invention, the parts being by weight, and the relationship between parts by weight and parts by volume being that of the kilogram to the liter:—

Example 1

243 parts of monoaminochrysene and 2400 parts of sulfuric acid of 10 per cent. strength are heated together in a pressure vessel for 4 hours at 220–225° C. After cooling, the mixture is filtered and the solid matter washed with water. The monohydroxychrysene remaining on the filter is a light-colored precipitate and represents a very good yield. It crystallizes from xylene in colorless crystals of melting point 240° C. It is insoluble in water, dissolves very sparingly in dilute caustic soda solution and couples with diazo-compounds.

A like result is obtained when, instead of dilute sulfuric acid dilute sulfurous acid or dilute hydrochloric acid is used.

Example 2

Monoaminochrysene is converted into its hydrochloride by treating it in alcoholic solution with hydrochloric acid.

279.5 parts of the dry monoaminochrysene-hydrochloride are heated in a pressure vessel for 10 hours at 230–235° C. with 3500 parts of water. After cooling, the mixture is filtered and the solid matter washed with water. The monohydroxychrysene remaining on the filter represents a very good yield.

Example 3

243 parts of monoaminochrysene and 2400 parts of acetic acid of 10 per cent. strength are heated together in an autoclave having a stirrer for 8 hours at 220–225° C. After cooling, the mixture is filtered and the solid matter washed with water. The monohydroxychrysene remaining on the filter is a pale yellow body and is obtained in good yield; for complete purification it may be recrystallized from xylene.

Example 4

122 parts of monoaminochrysene are suspended in 1200 parts by volume of acetic acid of 50 per cent. strength; for the purpose of raising the boiling point 600 parts of sodium sulfate are added. The whole is then heated to boiling in a reflux apparatus, while stirring, for 64 hours. After cooling, the mass is diluted with water, filtered, and the solid matter washed and dried. The crude product which still contains unaltered aminochrysene is boiled with dilute alkali solution which, advantageously, contains some alcohol, and after boiling has continued for a short time the mixture is filtered. By acidifying the somewhat yellow filtrate the monohydroxychrysene is precipitated. For complete purification it may be recrystallized from xylene; the dense crystals thus obtained melt at 240–242° C.

What I claim is:—

1. Process for producing a monohydroxychrysene from the monoaminochrysene obtainable by mononitrating chrysene and reducing the nitro-compound thus formed, consisting in heating this monoaminochrysene with dilute acids.

2. Process for producing a monohydroxychrysene from the monoaminochrysene obtainable by mononitrating chrysene and reducing the nitro-compound thus formed, consisting in heating this monoaminochrysene with dilute mineral acid.

3. Process for producing a monohydroxychrysene from the monoaminochrysene obtainable by mononitrating chrysene and reducing the nitro-compound thus formed, consisting in heating this monoaminochrysene with dilute sulfuric acid.

4. The monohydroxychrysene, which product represents colorless crystals of melting point 240 to 242° C., is insoluble in water and very difficultly soluble in dilute caustic soda solution, and couples with diazo-compounds.

WALTER KERN.